May 30, 1961   R. CRANMORE   2,986,178
PORTABLE CIRCULAR SAW WITH BLADE ALIGNMENT MEANS
Filed Nov. 4, 1959   2 Sheets-Sheet 1

INVENTOR
ROBERT CRANMORE
BY Chapin & Neal
ATTORNEYS

May 30, 1961 R. CRANMORE 2,986,178
PORTABLE CIRCULAR SAW WITH BLADE ALIGNMENT MEANS
Filed Nov. 4, 1959 2 Sheets-Sheet 2

INVENTOR
ROBERT CRANMORE
BY Chapin & Neal
ATTORNEYS

United States Patent Office

2,986,178
Patented May 30, 1961

2,986,178

PORTABLE CIRCULAR SAW WITH BLADE ALIGNMENT MEANS

Robert Cranmore, Shelburne Falls, Mass., assignor to Millers Falls Company, Greenfield, Mass., a corporation of Massachusetts Filed Nov. 4, 1959, Ser. No. 850,928

5 Claims. (Cl. 143—43)

This invention relates to power driven hand portable circular saws and in particular to means for properly aligning the blade of such saws with respect to the usual work engaging shoe plate commonly associated with this type of tool.

As will be recognized by those familiar with hand operated circular saws the usual shoe plate of the tool is a rectangular member on which the motor frame is mounted and in which a slot is provided for receiving the saw blade fixed on the axis of the motor and in a position normal to the plane of the plate. While a rip guide is commonly provided for guiding the cut in rip sawing work in the well known manner, on many occasions and particularly in making a cross cut in a board the user will guide the saw by abutting the free longitudinal edge of the shoe plate against any available straight edge and by sliding the shoe along in continually abutting relation a straight cut may be made without the use of scribed guide lines along which the blade itself my be advanced.

Since this latter method of using the longitudinal edge of the shoe plate for guiding purposes is fairly common, of necessity, the edge of the plate must be accurately parallel with the cut line of the saw (i.e. the line of intersection between the plane of the blade and the plane at the undersurface of the shoe plate). It has been found, however, in the manufacture of various components of this type of saw that manufacturing tolerances commonly permitted in the individual parts may result in the slight misalignment of the blade with respect to the edge of the shoe plate. This lack of true parallelism between blade and shoe edge is not readily observable but whether discovered by observation, or otherwise, on accurate inspection after assembly, the corrective measures needed have usually been time consuming or relatively expensive, the most usual remedy being to machine the various parts to achieve accuracy desired. It should also be pointed out that the same difficulty is often encountered in making repairs and replacement of the parts of such saw tools in the field.

The object of the invention is to eliminate such difficulties and expense as are described and to provide a simple, easily manipulated, adjustable mounting in the shoe plate and motor assembly to effect proper blade and guide edge alignment.

The above object and other objects and advantages of this invention will be more readily apparent from a reading of the following description with reference to the following drawings.

Figure 1:
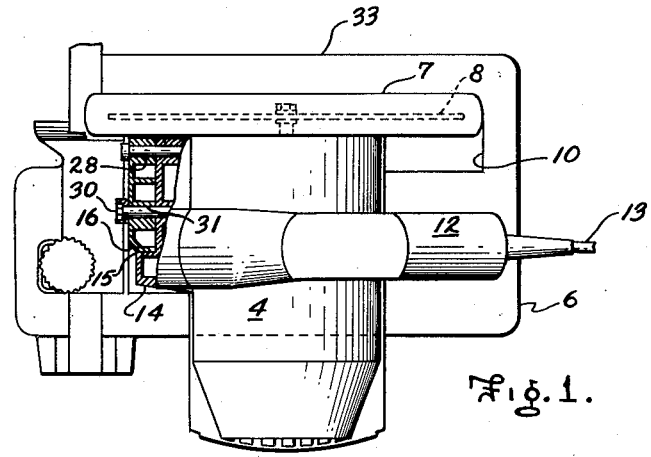
Fig. 1 is a plan view of a power operated hand saw embodying this invention and with parts cut away.

Referring now in detail to the drawings, a motor frame 4 is shown mounted on a work engaging plate or shoe 6. A circular saw blade 8 is mounted on the motor drive shaft and disposed within a cover 7. The saw blade extends below the under surface of the plate 6 through a slot 10 in the plate. A handle 12 is disposed on the upper portion of the motor frame and receives a wire or cable 13 by which power is supplied to the motor under the control of an on-off switch.

Figure 2:
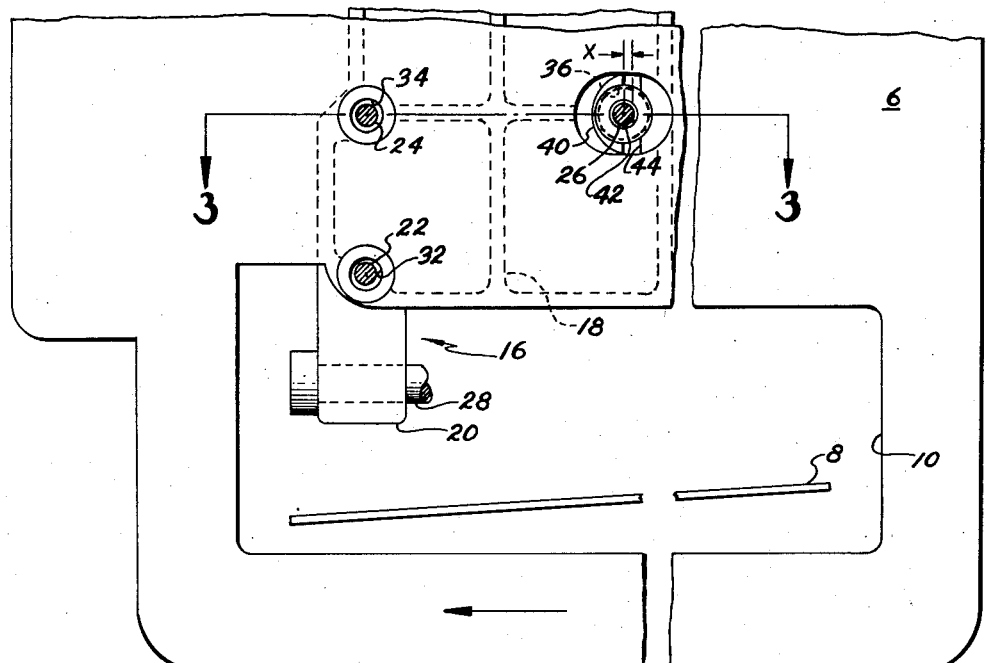
Fig. 2 is a partial bottom view of the unit shown in Fig. 1 on an enlarged scale and with parts omitted.

The motor frame 4 is secured to a depth segment 14 in suitable fashion. The depth segment 14 is disposed forwardly of the handle 12 and includes a recess 15 in which is received a bevel segment or bracket 16. The bevel segment 16 includes an upstanding portion 20 and a base portion 18 (Figs. 2 and 3) which underlies the depth segment 14 and the motor frame 4. The depth segment 14 and bracket 16 are connected together by means of a pin 28 which extends through a hole in the bracket 16 and is rotatable therein. The inner end of pin 28 is secured in the segment 14. Another pin 30 extends through a slot 31 in the bracket 16 and its inner end is secured in the depth segment 14. The slot 31 is of arcuate configuration extending through an angle of approximately 45° which is centered about the pin 28. This construction enables the depth segment 14 and the motor frame 4 attached thereto to be pivoted about a horizontal axis located by the pin 28. This pivotal movement of the motor frame enables the saw to be used in making bevel cuts. The pivotal movement of the motor frame 4 carries the saw blade 8 to a desired angular relationship with respect to the work engaging plate 6. The bracket 16 is attached to the plate 6 as shown in Fig. 2. Reference is made to Patent No. 2,839,098, issued June 17, 1958, for the constructional details of the bevel segment 16 and the depth segment 14.

The base portion 18 of the bevel segment or bracket is secured to the upper surface of the shoe plate 6 and is held in place by screws 22, 24, and 26, such as shown in Fig. 2. The components of this saw are dimensioned so that when they are assembled, the saw blade 8 will be positioned along a line parallel to an edge 33 of the shoe plate. In using this saw, the edge 33 of the shoe may be used to guide the saw blade 8 along a desired cutting line. It will therefore be appreciated that for effective cutting action, it is essential that the blade 8 be in parallelism with the edge 33 in the direction of movement of the saw, indicated by the arrow in Fig. 2.

For purposes of illustration, the blade 8 is shown in Fig. 2 as canted with respect to the guide edge 33. The canted condition shown in Fig. 2 is an extreme case of lack of parallelism between blade 8 and edge 33 and would seldom be encountered in actual practice. The components of this circular saw are dimensioned so that when they are assembled, the blade 8 will be parallel to the edge 33. However, since some of the components of this saw, such as the bevel segment 16 and the depth segment 14, are manufactured by die casting and may vary somewhat from casting to casting, such desired parallelism is not always achieved. After this unit is assembled, a check is made to insure that the blade 8 and the edge 33 are parallel. If they are not in parallelism, an adjustment must be made to bring them into that relationship. This hand operated power saw includes means by which the shoe plate and saw blade may be brought into parallelism by a simple adjustment. This alignment is accomplished without the necessity of machining any of the components of the unit.

Figure 3:
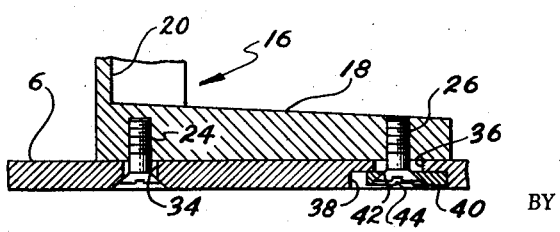
Fig. 3 is a section taken along line 3—3 of Fig. 2.

The means by which the bracket 16 is attached to the shoe plate 6 also provides the means for alignment of the shoe plate and the blade 8. The base portion 18 of the bevel segment includes three holes which are adapted to receive the screws 22, 24 and 26. The plate 6 also includes three holes 32, 34, and 36 which are disposed to register with the holes in the bevel segment 16. These latter holes are of substantially larger diameter than the screws 22, 24, and 26. The holes 32 and 34 are countersunk to a maximum diameter larger than the maximum diameter of the heads of the screws 22 and 24. As best shown in Fig. 3, the screws 22 and 24 are of the flat headed type, and when threaded into the base 18 of the bracket 16, the heads of these screws are recessed inwardly of the undersurface of the shoe plate 6. The screw heads will therefore not interfere with the smooth sliding movement of the plate 6 across the material being sawed. The holes 32 and 34 are aligned transversely of the edge 33 of the shoe plate 6 and the holes 36 and 34 are aligned generally parallel to the guiding edge 33 of the shoe plate. The hole 36 opens into a recess 38 in the underside of the plate 6.

The recess 38 is of elongated construction with its longer dimension disposed generally parallel with the edge 33 and its shorter dimension perpendicular thereto. An eccentric washer 40 having a countersunk hole 42 offset from the center of its outside diameter is held in place within the recess 38 by the screw 26. The screw 26 is similar to the screws 22 and 24 and engages the countersink of the hole 42. This countersink is also of larger diameter than the head of the screw 26, whereby the head is recessed within the washer 40. The outside diameter of the washer 40 is such that when it is disposed in the recess 38, it is engaged with opposite edge portions of the recess which define the smaller dimension of said recess. The washer 40 further includes a slot 44 which extends diametrically across the undersurface of the washer and provides the means whereby the washer may be rotated about the screw 26.

The washer 40 has an eccentric distance or "throw" X. In Fig. 2 the throw X is disposed parallel with the guiding edge 33 of the shoe plate. This may be considered the neutral position of the washer which may be rotated in either a clockwise or counterclockwise direction. Rotation of the washer 40 from its neutral position 90° in either direction will cause maximum tilt or pivotal movement of the plate 6. The extent of tilt of the plate 6 therefore varies directly as the sine of the angle of rotation of the washer from its neutral position to its position of maximum "throw," shown in Fig. 4.

Figure 4:
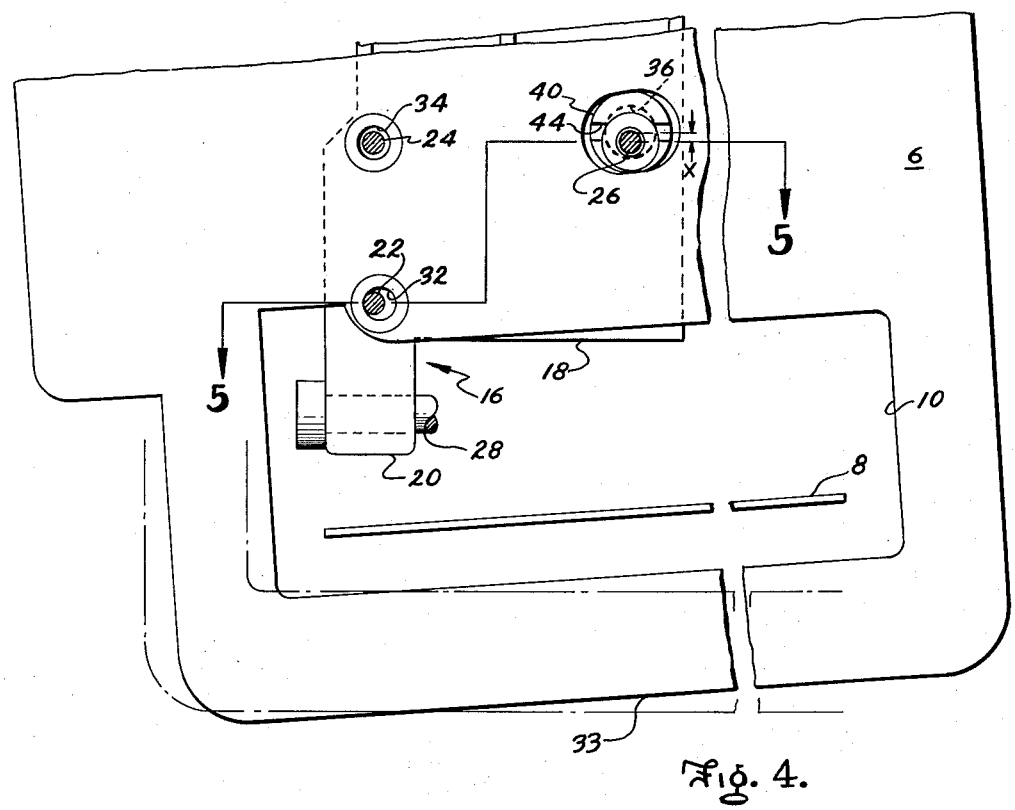
Fig. 4 is a view similar to Fig. 2 but with components disposed in different relationship.

In bringing the saw blade 8 and the guiding edge 33 into parallelism, the screw 26 is slightly loosened to permit rotation of the washer 40. Either screw 22 or 24 may be selected as the pivot point for the plate. The pivot screw is loosened only slightly to permit the plate to be rotated without binding. The other screw is loosened sufficiently to remove its head out of the countersink of the hole through which it extends. For purposes of illustration, the screw 24 will be considered as the pivot point. The screw 22 is loosened sufficiently so that its head will be completely clear of the countersink of the hole 32. As shown in Fig. 4, the washer 40 has been rotated 90° in a counterclockwise direction. The rotation of the washer 40 pivots or cams the plate 6 in a counterclockwise direction about the screw 24 and brings the edge 33 into parallel relation with the blade 8. While the washer has been rotated through an angle of 90° for illustrative purposes, it may be rotated through any angle and in either direction to correct a given lack of parallelism of blade 8 and the edge 33. As best seen in Fig. 4, the holes 32 and 34 are of sufficient diameter to permit maximum pivotal movement of the plate 6 about either screw 22 or 24. It will also be noted that the hole 36 through the plate 6 is of sufficient diameter to permit full 360° rotation of the washer 40.

After the plate 6 has been pivoted or cammed to its correct position, the screw 26 is tightened to lock or wedge the washer 41 in its selected position. The screw 24 is then tightened and finally the other screw 22 is tightened.

Figure 5:
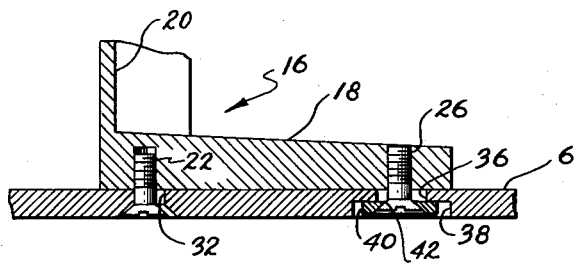
Fig. 5 is a section taken along line 5—5 of Fig. 4.

The three screws which are disposed in a triangular relationship wedge or lock the plate in parallel relation with the blade 8. As shown in Fig. 5, the screws 22 and 26 are recessed inwardly of the undersurface of the plate 6 even though screw 26 is axially misaligned with the center of hole 32.

The means by which the blade 8 and the guiding edge 33 are brought into parallelism may be advantageously used in the assembly of the saw by the manufacturer or in subsequent repair or replacement of saw components. The saw assembly eliminates entirely the more expensive and time consuming alignment methods and results in lower manufacturing costs and repair costs to the consumer.

Having described my invention, what is claimed is:

1. A power driven hand saw comprising a work contacting plate, a drive motor carried on the upper surface of said plate, a circular saw blade mounted on the drive shaft of said motor and extending below the undersurface of said plate, said plate having an edge portion for guiding the saw along a cutting line, fastener members securing said drive motor in a fixed position on said plate and extending therethrough, and means pivotably disposed on at least one of said fastener members for camming said plate horizontally whereby the guiding edge portion of said plate may be aligned with said saw blade in mutually parallel relation.

2. A power driven hand saw comprising a work contacting plate, a drive motor carried on the upper surface of said plate, a circular saw blade mounted on the drive shaft of said motor and extending below the undersurface of said plate, said plate having an edge portion for guiding the saw along a cutting line, fastener members securing said drive motor in fixed position on said plate and extending therethrough, the underside of said plate being provided with a recess about at least one of said fastener members, and a washer having an eccentric opening receiving said one fastener member and held in said recess thereby, said washer and recess being dimensioned so that rotation of said washer about said one fastener member pivots the work contacting plate horizontally whereby the guiding edge portion of said plate may be aligned with said saw blade in mutually parallel relation.

3. A power driven hand saw comprising a work contacting plate, a bracket mounted on the upper surface of said plate, a drive motor carried by said bracket, a saw blade mounted on the drive shaft of said motor and extending below the undersurface of said plate, said plate having an edge portion for guiding the saw blade along a cutting line, fasting members extending through holes in said plate and into said bracket and including head portions, the underside of said plate being provided with a recess disposed about one of said holes, said recess being of elongated configuration in a direction parallel with said edge portion, and a washer having an eccentric hole pivotally disposed on the fastening member in the elongated recess for horizontally pivoting said plate with relation to said saw blade to bring said edge into parallel relation with said blade, the holes through said plate being sufficiently larger than said fastening members to permit the plate to be so pivoted.

4. A power driven hand saw comprising a work contacting plate, a bracket mounted on the upper surface of said plate, a drive motor carried by said bracket, a saw blade mounted on the drive shaft of said motor and extending below the under surface of said plate, said plate having an edge portion for guiding the saw blade along a cutting line, fastening members extending through holes in said plate and into said bracket and including head portions, recesses in the underside of said plate receiving the heads of said fastening members, one of said recesses being of elongated configuration in a direction parallel with said edge portion, and an eccentric washer pivotally disposed on the fastening member in the elongated recess for horizontally pivoting said plate with relation to said saw blade to bring said edge into parallel relation with said blade, the holes through said plate being sufficiently larger than said fastening members to permit the plate to be pivoted through the full eccentricity of said washer, said holes further being disposed in triangular relation and said recesses being of sufficient size to enable said plate to be secured in a selected position even when said screws are axially misaligned with said holes and with the heads of said screws recessed within said plate.

5. A power driven hand saw comprising a work contacting plate, a bracket mounted on the upper surface of said plate, a drive motor carried by said bracket, a saw blade mounted on the drive shaft of said motor and extending below the undersurface of said plate, said plate having an edge portion for guiding the saw blade along a cutting line, two screws extending through countersunk holes in said plate and into said bracket, said holes disposed in a line transverse to said edge portion, a recess in the underside of said plate of elongated configuration in a direction parallel to said edge portion, a third screw extending through another hole in said plate and in communication with said recess, and an eccentric washer pivotally disposed on said third screw for horizontally pivoting said plate with relation to said saw blade to bring said edge portion into parallel relation with said blade, said washer having a countersunk hole for receiving the head of said third screw, the holes through said plate being sufficiently larger than said screws to permit said plate to be pivoted through the full eccentricity of said washer, the holes through said plate being disposed in triangular relation and the countersinks being sufficiently larger than the heads of said screws to enable said plate to be secured in a selected position even when said screws are axially misaligned with said holes and with the heads of said screws recessed within said plate.

References Cited in the file of this patent

UNITED STATES PATENTS

| | | |
|---|---|---|
| 1,842,630 | Rodning | Jan. 26, 1932 |
| 1,911,045 | Tinnen | May 23, 1933 |
| 2,346,961 | Gumdefomger et al. | Apr. 18, 1944 |
| 2,770,265 | Pollock | Nov. 13, 1956 |
| 2,810,412 | Roug | Oct. 22, 1957 |